Feb. 18, 1930.                K. PRAZMO                1,747,882
                    AUTOMOBILE EXHAUST GAS PURIFIER
                         Filed Feb. 1, 1928
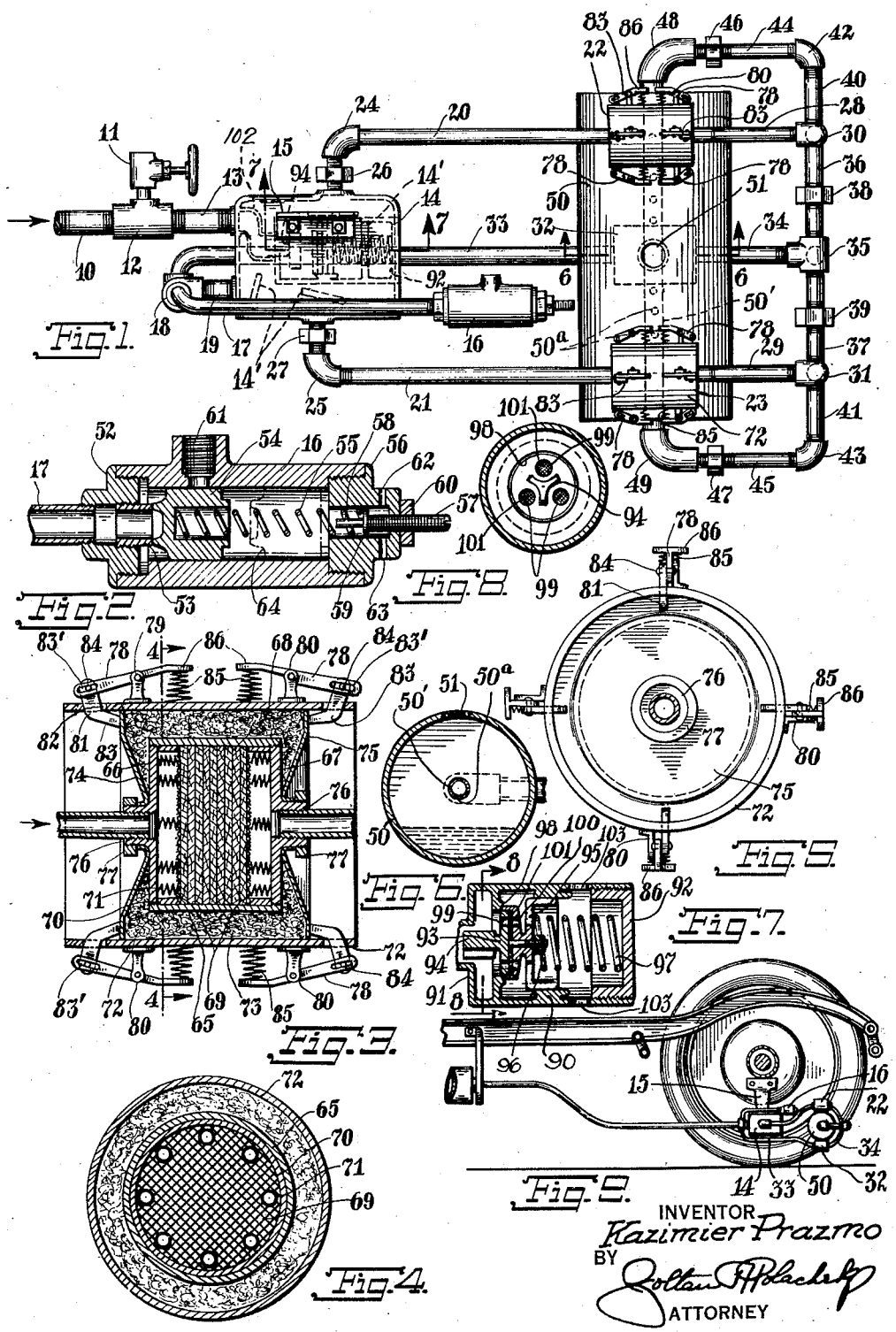
INVENTOR
Kazimier Prazmo
BY
[signature]
ATTORNEY Patented Feb. 18, 1930

1,747,882

UNITED STATES PATENT OFFICE

KAZIMIER PRAZMO, OF NEW YORK, N. Y.

AUTOMOBILE EXHAUST-GAS PURIFIER

Application filed February 1, 1928. Serial No. 251,065.

This invention relates to a new and useful device in the nature of an automobile exhaust purifier especially adapted for the purpose of collecting the monoxide gas from the exhaust of an automobile motor.

The object of the invention is to provide a device of the class described to be readily attached to the exhaust pipe of an automobile motor.

A further object of the invention is to provide a device of the class described of novel construction and arrangement of parts hereinafter more fully described, claimed and illustrated in the accompanying drawing.

Fig. 1 is a plan view of my improved device.

Fig. 2 is an enlarged longitudinal central sectional view of the relief valve as embodied in my improved device.

Fig. 3 is a similar sectional view of the purifier as embodied therein.

Fig. 4 is a transverse sectional view taken on the line 4—4 of Fig. 3.

Fig. 5 is an end elevational view of the purifier proper.

Fig. 6 is a sectional view taken on the line 6—6 of Fig. 1.

Fig. 7 is a central longitudinal sectional view of the strainer valve as embodied in my improved device.

Fig. 8 is a transverse sectional view taken on the line 8—8 of Fig. 7.

Fig. 9 is a side elevational view of the device mounted on a car.

As here embodied my improved automobile exhaust purifier has an inlet pipe 10, connected in any suitable convenient manner to the exhaust pipe of an automobile motor. The valve 11 is connected to the T fitting 12, connected to the inlet 10 and to the nipple 13, which is connected to the header 14. The valve 11 is provided for the purpose of permitting the exhaust to be released therethrough when open, as is desired when not using my improved device. The header 14 is of hollow construction adapted to contain or hold the strainer valve body 90, substantially of tubular construction provided with a closed end 91, and a removable end 92 threadedly attached thereto. The strainer valve proper 93 is provided with a pilot 94, slidably engaging in an aperture formed in the closed end 91. The guide 95 is secured as at 96, to the valve proper 93, and slidably engages in the said valve body 90. The expansion spring 97 is positioned in the valve body 90 intermediate the closed end 92 and the guide 95, as a means of normally holding the said valve proper in engagement with the valve seat 98 formed in the valve body 90. The valve proper and the guide have formed therein apertures 99 and 100, respectively in registration with each other. The strainer 101 of fine mesh wire screening is positioned in the valve proper. The closed end of the valve body and the above mentioned tubular member 13 are connected by means of the tubular member 102. The above described construction is such as will permit the exhaust to be admitted through the tubular member 102 and through the apertures 99, so as to allow the strainer to extract the solid particles therefrom, and to permit the remainder of the said exhaust to pass through the apertures 103 formed in the valve body into the header. The said construction is also such as will permit the said exhaust in event the strainer is clogged to slidably open the valve proper as a means of permitting unrestricted passage of the said exhaust. Baffle plates 14' are positioned in the said header as a means of retaining the passage of the exhaust into the tubular members 19, 20 and 21. A bracket 15 is secured to the header and may be of any suitable design, adapted for the purpose of attaching my improved device to any convenient suitable portion of the chassis frame of the automobile.

The relief valve 16 hereinafter described and set forth is connected to the pipe 17, which is connected to the T 18 having connected thereto a nipple 19 connected to the header 14. A pair of pipes 20 and 21 are connected to the purifiers proper 22 and 23 hereinafter described and set forth, and to the elbows 24 and 25 connected by means of the unions 26 and 27 to the header 14. The purifiers proper 22 and 23 are suitably connected by means of the pipes 28 and 29 to the T's 30 and 31. The purifier proper 32 of the same type as purifiers 22 and 23 is connected by means of the pipe 33 to the above mentioned T 18. The pipe 34 is connected to the purifier proper 32 and to the T 35. The above mentioned T's 30, 31 and 35 are interconnected by means of the pipes 36 and 37, having interposed therein unions 38 and 39. The pipes 40 and 41 are connected to the elbows 42 and 43, connected to the pipes 44 and 45, which are connected to the unions 46 and 47. The unions 46 and 47 are connected to the elbows 48 and 49 which are connected by a pipe 50' passing thru the tank 50 or container.

The pipe 50' is provided with a plurality of apertures 50$^a$ at the bottom to allow the gas to exhaust into carbolic acid or other suitable chemicals contained in the bottom of tank 50. The tank is of hollow cylindrical construction and is provided with an opening 51 for filling the chemical in the tank. After the gas passes thru apertures 50$^a$ it mixes with the chemical, purifies the gas and exhausts thru aperture 51. The carbon monoxide in the gas is absorbed by the chemicals in the tank, and the gas discharged into the atmosphere thru opening 51 is free from carbon monoxide and free particles of carbon.

The relief valve 16 comprises a body member of hollow cylindrical construction having threadedly attached thereto, at any one extremity thereof, a threaded nut 52, of hollow construction having a threaded aperture adapted to receive the above mentioned pipe 17. The bushing 53 or valve seat is threadedly attached co-axial to the nut 52. The valve proper 54 is slidably mounted in the body member of the relief valve and has formed therein a co-axial opening, so as to provide a valve proper of light construction. The expansion spring 55 is positioned in the opening formed in the valve proper 54 and is co-axial in the valve body. The nut 56 is threadedly secured to the valve body at the opposite extremity of the valve body, and has formed therein an opening adapted to receive the spring 55. The adjustment screw 57 is threadedly mounted in the nut 56 and is provided with a stem 58 positioned inside the valve body, and an enlarged intermediate portion 59 adapted to support one extremity of the spring 55. A lock nut 60 is threadedly mounted in the screw 57 and is adapted to engage the nut 56 as a means of securely holding the screw 57 in any desired position. The latter described construction is such as will permit the spring 55 to be adjustably tensioned so as to normally hold the valve proper 54 on the valve seat 53, at the desired pressure. Transverse apertures 62 and 63 are formed in the nut 56 and register with the above mentioned opening formed in the said nut. The valve body 16 is provided with an outlet aperture 61, intermediate the extremities thereof. The above described construction is such as will permit the exhaust in the header 14 to be released therefrom, through the aperture 61, when the pressure of the said exhaust reaches the pressure necessary to disengage the valve proper 54 from the seat 53, and position it as shown in dotted lines at 64, so as to provide a relief or safety valve which will eliminate an excessive back pressure being imposed on the automobile motor to which my improved device is attached.

The purifiers proper for moving free particles of carbon from the gases as embodied in my improved device comprise a tubular member 65 having theadedly attached thereto at the extremities thereof, plate members or ends 66 and 67. A plurality of felt, cotton wadding or other suitable discs 68 are positioned in the tubular member 65, intermediate the screens 69 and are held in an engaged position by means of the collars 70 and the expansion springs 71 positioned therein.

The tubular member 72 is adapted to enclose or cover the above mentioned tubular member 65 and is of suitable size in diameter so as to provide a space 73 intermediate the tubular members. End members 74 and 75 are adapted to engage in the tubular member 72 and are of plate shape construction, and are provided with an axial opening adapted to engage over the hubs 76 of the plate members 66 and 67, and are removably secured thereto by means of the collars 77 threadedly mounted on the said hubs 76.

A plurality of levers 78 are hinged as at 79, intermediately to the brackets 80 secured to and extended from the tubular member 72. The engaging members 81 slidably engage in elongated openings 82 formed at or near the extremities of the said tubular member and are provided with extended elements 83, or extremities adapted to engage the end members 74 and 75. The levers 78 have formed therein elongated openings 83' adapted to receive the pins 84 carried in the extremities of the engaging members 81. The expansion spring 85 is positioned intermediate the enlarged extremities 86 of the levers 78. The above described construction is such as will normally urge the end members 74 and 75 inwardly, as a means of somewhat compressing the heat insulating material, preferably asbestos or the like, placed in the space 73, as a means of preventing the exhaust in the purifiers proper from attaining a lower temperature.

It has been found that in a hot condition of the gases, the action of the purifier is more efficient. When a motor is initially started it has a cold exhaust and the heat retained by the asbestos 73 from a previous running of the motor is depended upon to more efficiently purify the gas.

It is to be understood that my device may also be used for purifying smoke from other sources, as for example from chimneys.

While I have shown and described a preferred embodiment of my invention, it is to be understood that I do not limit myself to the precise construction herein disclosed and the right is reserved to all changes and modifications coming within the scope of the invention as defined in the appended claims.

Having thus described my invention, what I claim as new and desire to secure by United States Letters Patent:—

1. A device for removing free particles of carbon from automobile exhaust gas, comprising a tubular member, plate members with central openings attached on the ends thereof, a plurality of felt discs within the tubular member, a screen on the outer face of the first and last disc, expansion springs between the screens and the plate members, a large tubular member encircling the first tubular member, end members within the large tubular member and on opposite ends of the plate members, and asbestos surrounding the first tubular member and packed between the said end members.

2. A device for removing free particles of carbon from automobile exhaust gas, comprising a tubular member, plate members with central openings attached on the ends thereof, a plurality of felt discs within the tubular member, a screen on the outer face of the first and last disc, expansion springs between the screens and the plate members, a large tubular member encircling the first tubular member, end members within the large tubular member and on opposite ends of the plate members, a means for resiliently urging the end members together, and asbestos surrounding the first tubular member and packed between the said end members.

3. A device for removing free particles of carbon from automobile exhaust gas, comprising a tubular member, plate members with central openings attached on the ends thereof, a plurality of felt discs within the tubular member, a screen on the outer face of the first and last disc, expansion springs between the screens and the plate members, a large tubular member encircling the first tubular member, end members within the large tubular member and on opposite ends of the plate members, a means for resiliently urging the end members together, and asbestos surrounding the first tubular member and packed between the said end members, said means including levers and springs.

In testimony whereof I have affixed my signature.

KAZIMIER PRAZMO.